F. NEWBAUER.
PNEUMATIC PUNCTURE PROOF TIRE.
APPLICATION FILED APR. 2, 1913.

1,084,470.

Patented Jan. 13, 1914.

WITNESSES
George Bambay
J. L. McAuliffe

INVENTOR
Paltine Newbauer
BY Munn & Co.
ATTORNEYS

UNITED STATES PATENT OFFICE.

FALTINE NEWBAUER, OF VALLEY CITY, NORTH DAKOTA, ASSIGNOR OF ONE-THIRD TO EMIL FELDMANN, OF VALLEY CITY, NORTH DAKOTA.

PNEUMATIC PUNCTURE-PROOF TIRE.

1,084,470. Specification of Letters Patent. Patented Jan. 13, 1914.

Application filed April 2, 1913. Serial No. 758,347.

*To all whom it may concern:*

Be it known that I, FALTINE NEWBAUER, a citizen of the United States, and a resident of Valley City, in the county of Barnes and State of North Dakota, have invented a new and Improved Pneumatic Puncture-Proof Tire, of which the following is a full, clear, and exact description.

My invention relates to pneumatic tires designed for use on automobiles, and includes a novel, detachable, puncture-proof tread, as well as a tire extending continuously in closed form at the inner side, whereby the inner tube is effectively protected against possible damage by defective wheel rims.

The distinguishing features of my invention, and the important elements characterizing the preferred embodiment which is illustrated as an example, will be particularly explained in the specific description following.

Reference is to be had to the accompanying drawing forming a part of this specification, in which similar characters of reference indicate corresponding parts.

Figure 1:
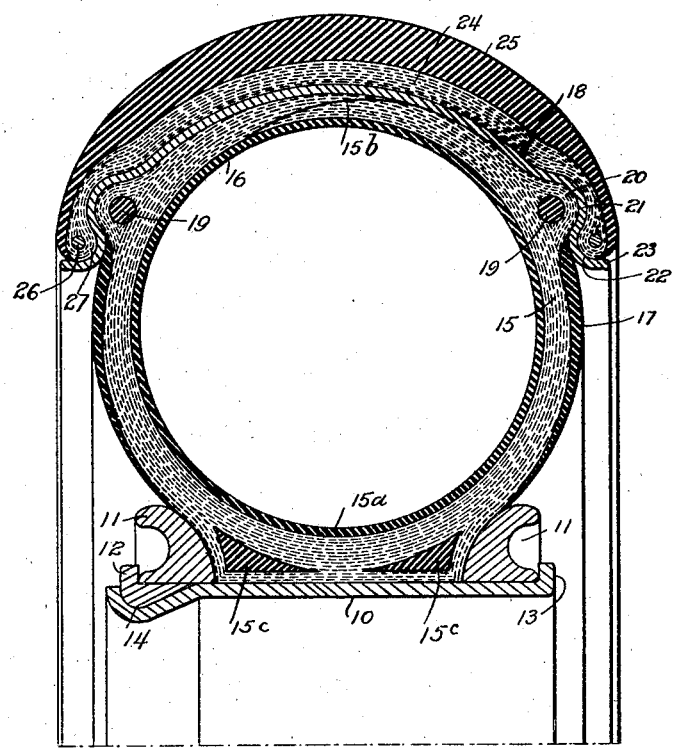
Figure 2:
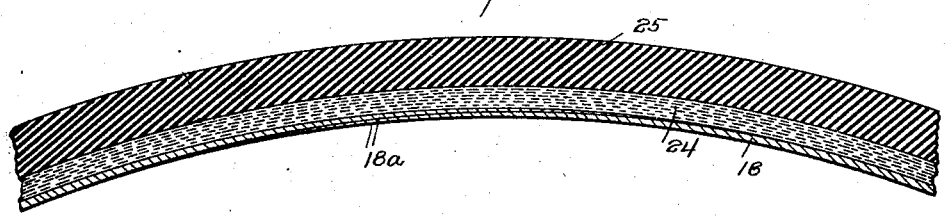

Figure 1 shows in cross section a tire embodying my invention and Fig. 2 is a detail longitudinal section of the detachable tread, showing the overlapped ends of the tread rim.

The tire is illustrated in connection with a standard rim 10, having clencher rings 11 and a locking ring 12, the rim having the usual side flange 13 and the usual channel 14 to receive the locking ring 12. The tire body or shoe 15 extends continuously in closed form at the inner side or rim portion, as at 15ª and is open at the tread portion, being formed with beveled, overlapped edges as at 15ᵇ.

An inner tube 16 of any approved form is employed, and at the closed inner portion of the tire any approved arrangement of annular, hardened, clencher members, usually of hard rubber 15ᶜ are incorporated in the tire to co-act with the clencher rings 11. In the preferred example the outer casing 17 of the tire terminates at the sides and does not extend across the tread as in the ordinary form of tire.

A novel, detachable tread is provided, which consists of a metallic tire rim or tread rim 18, hereinafter designated as a tread rim in distinguishing it from the wheel rim. To retain the tread rim detachably in position, the tire 15 is formed with annular, hardened elements 19, usually of hard rubber, at each side outward radially from the edges of the outer casing 17, there being produced in the tire 15 adjacent to the hardened annular elements 19, beads or ribs 20 extending annularly at each side, to present lateral shoulders that are received in channels in the tire rim 18, the channels being produced by forming bends 21 in the tread rim, the channels thus produced presenting shoulders opposed to and engageable under the shoulders 20 of the tire. The side edges of the tread rim 18 are further formed with exterior grooves or depressions 22, the extreme edges 23 extending outward laterally beyond the beads 20 and beyond the casing elements 17 to prevent puncture of said casings at the sides. The grooves or depressions 22 receive the side edge of a detachable cushion comprising a base 24 of canvas and rubber and a facing 25 of rubber. To retain the detachable tread cushion in position, rings 26, preferably of carbon steel wire are incorporated and vulcanized therein, thereby providing enlarged or shouldered edge portions 27 at the inner sides of the cushion, which are received within the annular grooves 23 of the wheel rim.

It is obvious that the inflation of the inner tube through the medium of the usual valve (not shown) will serve to distend the shoe or tire body 15 and hold the protuberant or ribbed annular portions 20 in engagement with the channeled sides of the tire rim 18.

By forming the tire 15 in closed form to extend continuously at its inner periphery or clencher portion, a continuous projection is afforded beneath the inner tube 16, by reason of which the inner tube is protected against the possibility of injury on account of any defects in the wheel rim 10 or its appurtenances, while at the same time the overlapped tread portion 15ᵇ affords the necessary provision for the insertion and removal of the inner tube. The metallic tread rim 18, it is obvious, constitutes an absolute protection against puncturing of the inner tube, while the side edges of said tread rim prevent rim cutting. The provision of the detachable tread cushion on the tire rim enables me to renew the tread, and thus at a comparatively trifling cost, restore the tire to its original serviceable condition.

To facilitate the placing of the rim 18 within the tread it is made in the form of a split rim, the ends overlapping and being beveled as at 18ª (Fig. 2).

The described construction affords a practical means for carrying my invention into effect, and I would state in conclusion that I do not limit myself strictly to the mechanical details herein illustrated, since manifestly the same can be considerably varied without departing from the spirit of the invention.

Having thus described my invention, I claim as new, and desire to secure by Letters Patent:

A pneumatic tire comprising a resilient shoe, having rim-engaging means at the inside and exterior annular beads on the shoe at the sides inward from the tread, there being side casings between the beads and the rim-engaging means, a transversely curved metallic rim fitting over the resilient shoe, said rim presenting exterior annular beads and presenting at the inner sides of the beads exterior annular channels corresponding with and receiving the annular beads of the shoe, the rim furthermore presenting exterior annular channels radially inward from the interior channels, the rim having terminal side edges projecting laterally beyond the exterior beads of the rim and beyond the side casings, and a tread cushion fitting over the said rim, said cushion conforming to the exterior beads of the rim and having thickened edge portions received against the laterally projecting edge portions of the rim and fitting the exterior channels of the said rim.

In testimony whereof I have signed my name to this specification in the presence of two subscribing witnesses.

FALTINE NEWBAUER.

Witnesses:
M. J. ENGLISH,
JOSEPHINE EFTELAND.